United States Patent
Goetzelmann et al.

(10) Patent No.: US 10,243,649 B2
(45) Date of Patent: Mar. 26, 2019

(54) NEAR-REAL TIME EIRP MONITORING DEVICE/SYSTEM

(71) Applicant: Airbus Defence and Space GmbH, Taufkirchen (DE)

(72) Inventors: Martin Goetzelmann, Neubiberg (DE); Matthias Soellner, Gauting (DE); Joachim Schupp, Munich (DE); Michael Kirchner, Munich (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 0 days.

(21) Appl. No.: 15/951,559

(22) Filed: Apr. 12, 2018

(65) Prior Publication Data

US 2018/0302148 A1    Oct. 18, 2018

(30) Foreign Application Priority Data

Apr. 18, 2017   (EP) .................................. 17166835

(51) Int. Cl.
   *G01S 19/02* (2010.01)
   *G01S 19/39* (2010.01)
   (Continued)

(52) U.S. Cl.
   CPC .......... *H04B 7/18513* (2013.01); *G01S 19/02* (2013.01); *H04B 7/18523* (2013.01);
   (Continued)

(58) Field of Classification Search
   CPC .... G01S 13/003; G01S 13/34; G01S 13/5242; G01S 19/07; G01S 19/36; G01S 19/426;
   (Continued)

(56) References Cited

U.S. PATENT DOCUMENTS 4,567,485 A * 1/1986 Oshima ................. H04W 52/38
                                                    342/352
4,896,369 A * 1/1990 Adams, Jr. ......... H04B 7/18513
                                                    455/10

(Continued)

OTHER PUBLICATIONS

European Search Report, dated Oct. 11, 2017, priority document.
(Continued)

*Primary Examiner* — Dung Hong
(74) *Attorney, Agent, or Firm* — Greer, Burns & Crain, Ltd.

(57) ABSTRACT

A method and apparatus for detecting an Equivalent Isotropically Radiated Power (EIRP) degradation of a satellite radio frequency (RF) transmitter being in a repeating ground track orbit. Sets of signal-to-noise ($C/N_0$) and satellite orbit data are obtained from first and second sources. Each data set is associated with the satellite and one of several receivers. Computing temporal information on an elevational and azimuthal satellite direction for each receiver location. A temporal information based time interval is determined for a single ground track. Determining, for each receiver, one of a first plurality of differences between a first time point data set value and a second time point data set value. The two time points differ by the time interval. A first average of the first plurality of differences is computed and compared with a predetermined threshold. A signal is triggered when the computed first average is larger than the threshold.

14 Claims, 4 Drawing Sheets

(51) Int. Cl.
  *H04B 7/185* (2006.01)
  *H04W 72/04* (2009.01)
  *H04W 84/06* (2009.01)

(52) U.S. Cl.
  CPC .... *H04B 7/18543* (2013.01); *H04W 72/0473* (2013.01); *H04W 84/06* (2013.01); *G01S 19/39* (2013.01)

(58) Field of Classification Search
  CPC ............ H04B 7/18513; H04B 7/18523; H04B 7/18543; H04W 72/0473; H04W 84/06; G06F 2221/2111; G06Q 20/382
  See application file for complete search history.

(56) References Cited

U.S. PATENT DOCUMENTS

| | | | | |
|---|---|---|---|---|
| 9,668,102 | B1* | 5/2017 | Ananth | H04W 84/022 |
| 2003/0013409 | A1* | 1/2003 | Buckshaw | H04B 7/18513 |
| | | | | 455/9 |
| 2004/0224634 | A1* | 11/2004 | Kim | H04B 7/18543 |
| | | | | 455/13.4 |
| 2011/0007647 | A1* | 1/2011 | Miller | H04B 7/18586 |
| | | | | 370/252 |
| 2012/0213099 | A1* | 8/2012 | Cheng | H04L 1/0003 |
| | | | | 370/252 |
| 2014/0266867 | A1* | 9/2014 | Liu | G01S 1/042 |
| | | | | 342/200 |
| 2015/0156734 | A1* | 6/2015 | Touret | H04B 7/18513 |
| | | | | 370/311 |

OTHER PUBLICATIONS

"Kolloquium Satellitennavigation—TU Muenchen Content", Gnss et al., 2009-07-06.

"Ground Station Testing on Satellites in Orbit Application Note Application Note: DVB-S2 &DVB-S2X Signal Generation in K-Brand and Analysis Table of Contents..", M Naseef et al., Dec. 1, 2016.

"GNSS Payload and Signal Characterization using a 3m Dish Antenna", Gisbert et al., Sep. 21, 2012.

Genrich, J.F., Y. Bock (1992), "Rapid resolution of crustal motion at short ranges with the Global Positioning System", J. Geophy. Res., 97, 3261-3269.

Choi, K., Billich, A., Larson K.M., Axelrad, P. (2004), "Modified sidereal filtering: Implications of high-rate GPS positioning" Geophysical Research Letters, vol. 31, Nov. 2004.

* cited by examiner

NEAR-REAL TIME EIRP MONITORING DEVICE/SYSTEM

CROSS-REFERENCES TO RELATED APPLICATIONS

This application claims the benefit of the European patent application No. 17166835.3 filed on Apr. 18, 2017, the entire disclosures of which are incorporated herein by way of reference.

BACKGROUND OF THE INVENTION

This disclosure concerns a method and a monitoring device for detection of an Equivalent Isotropically Radiated Power (EIRP) degradation of a transmitter of a satellite transmitting RF signals and being subject to a repeating ground track.

The EIRP characterizes radio frequency (RF) signal transmission power of a transmitter of a satellite in a direction of the main satellite antenna beam. It depends on the directivity of the satellite antenna (antenna gain) and the input RF transmission power.

Besides an RF environment of the receiving ground antenna and the receiver and antenna characteristics, the signal-to-noise ratio (C/N0) of the received signal on ground depends on the satellite EIRP.

For this reason, the EIRP is an important parameter for characterizing the signal transmission power to be monitored for any satellite transmitting RF signals in a satellite system or satellite service, for example for GNSS systems, like GPS, Galileo, Beidou or GLONASS, and SBAS systems like EGNOS or WAAS. The quality of the received RF signal in terms of signal-to-noise ratio depends on the EIRP.

Routine periodic measurements of a boresight EIRP are regularly conducted by means of dedicated measurement campaigns using high-gain antennas, for example 20 m high-gain dish antennas. For reasons of cost and effort, such measurement campaigns are usually not set up more often than once per month. However, there is the need for more frequent EIRP measurements or even for permanent EIRP monitoring in order to detect any anomaly in signal transmission power or any variation in the satellite antenna gain pattern within near real-time.

SUMMARY OF THE INVENTION

It is thus an object of this disclosure to provide a permanent EIRP monitoring to identify and detect a satellite's transmitter malfunction before the definite loss of signals transmitted by the transmitter.

According to a first aspect, a method for detection of an Equivalent Isotropically Radiated Power (EIRP) degradation of a radio frequency (RF) transmitter of a satellite being in an orbit with a repeating ground track is provided. The satellite can be a Global Navigation Satellite System (GNSS) satellite. The method comprises obtaining sets of signal-to-noise (C/N0) data from a first source and obtaining satellite orbit data of the satellite from a second source. Each set of C/N0 data is associated with the satellite and a respective one of a plurality of receivers, for example one or several ground receivers. The method further comprises computing temporal information on an elevational and azimuthal direction of the satellite with respect to respective locations of each of the plurality of receivers based on the satellite orbit data and the respective locations of each of the plurality of receivers. The method further comprises determining a time interval based on the temporal information. The repeating ground track repeats a single time in the time interval. As a result, the satellite is located in at least approximately a same elevational and azimuthal direction at times being the time interval apart. The method further comprises determining, for each of the plurality of receivers, a respective one of a first plurality of differences between a first value of the respective set of C/N0 data corresponding to a first time point and a second value of the respective set of C/N0 data corresponding to a second time point. The first and second time points are apart by the time interval. The method further comprises computing a first average of the first plurality of differences. The method further comprises comparing the computed first average with a predetermined threshold. The method further comprises triggering a signal, when the computed first average is larger than the predetermined threshold. The signal indicates detection of the EIRP degradation of the transmitter.

The terms "set" and "sets" can be understood as a non-closed amount of data being continuously updated by new data. The term "a single time" means substantially once or exactly once.

The first source can be associated with a plurality of receivers on ground. The second source can be associated with the satellite or a satellite orbit data base. The first source and the second source can be the same.

A number of the sets of C/N0 data can correspond to a number of receivers on ground times a number of satellites to be monitored.

The first source can be a service provider ground network or a public network of the plurality of receivers. The second source can be a plurality of public sources for satellite orbit data, for example two-line elements, or one of the satellites which broadcasts orbit data.

The satellite orbit data can be obtained for a present day and two epochs. The step of computing the temporal time information is performed for the present day and the two reference epochs. The term "reference epoch" may also be referred to as "reference period." The reference epoch can be apart from the present day by once or twice the time interval.

After, before or simultaneously, the step of determining the first plurality of differences is performed, the step of determining, for each of the plurality of receivers, a respective one of a second plurality of differences between the first value of the respective set of C/N0 data corresponding to a first time point and a third value of the respective set of C/N0 data corresponding to a third time point can be performed. The first and third time points can be apart by twice the time interval.

In this way, EIRP variation occurring at the first time point (which is present in both pluralities of differences) can be distinguished from EIRP variation that had already occurred at one of the reference time points (and is only present in one of both pluralities of differences). In addition, better accuracy and precision of EIRP monitoring is achieved by considering multiple pluralities of differences.

The method can further comprise the step of computing a second average of the second plurality of differences. The method can further comprise the step of comparing the computed second average with the predetermined threshold. The method can further comprise the step of triggering a signal. The signal can indicate detection of the EIRP degradation of the transmitter when the computed first average is larger than the predetermined threshold and when the computed second average is larger than the predetermined threshold.

According to a second aspect, a monitoring device for detection of an Equivalent Isotropically Radiated Power (EIRP) degradation of a radio frequency (RF) transmitter of a satellite is provided. The satellite is in an orbit or has an orbit with a repeating ground track. The satellite may be part of a Global Navigation Satellite System (GNSS). The monitoring device comprises a receiving unit and a processing unit. The receiving unit is adapted to receive sets of signal-to-noise (C/N0) data from a first source. The receiving unit is further adapted to receive satellite orbit data of the satellite from a second source. Each set of C/N0 data is associated with the satellite and a respective one of a plurality of receivers. The processing unit is adapted to compute temporal information on an elevational and azimuthal direction of the satellite with respect to respective locations of each of the plurality of receivers based on the satellite orbit data and the respective locations of each of the plurality of receivers. The processing unit is further adapted to determine a time interval based on the temporal information. The repeating ground track repeats a single time in the time interval. As a result, the satellite is located in at least approximately a same elevational and azimuthal direction at times being the time interval apart. The processing unit is further adapted to determine, for each of the plurality of receivers, a respective one of a first plurality of differences between a first value of the respective set of C/N0 data corresponding to a first time point and a second value of the respective set of C/N0 data corresponding to a second time point. The first and second time points are apart by the time interval. The processing unit is further adapted to compute a first average of the first plurality of differences. The processing unit is further adapted to compare the computed first average with a predetermined threshold. The processing unit is further adapted to trigger a signal, when the computed first average is larger than the predetermined threshold. The signal indicates detection of the EIRP degradation of the transmitter.

The first source may be associated with a plurality of receivers on ground. The second source may be associated with the satellite or a satellite orbit data base.

The number of the sets of C/N0 data may correspond to a number of receivers on ground times a number of satellites to be monitored.

The first source may be a service provider ground network or a public network of the plurality of receivers. The second source may be a plurality of public sources for satellite orbit data or one of the satellites broadcasting orbit data.

The receiving unit may further be adapted to receive the satellite orbit data for a present day and two reference epochs. Further, the processing unit may be adapted to compute the temporal time information for the present day and the two reference epochs, wherein the reference epoch is apart from the present day by once or twice the time interval.

The processing unit may further be adapted to determine, after, before or simultaneously determining the first plurality of differences, for each of the plurality of receivers, a respective one of a second plurality of differences between the first value of the respective set of C/N0 data corresponding to a first time point and a third value of the respective set of C/N0 data corresponding to a third time point, wherein the first and third time points are apart by twice the time interval.

The processing unit may further be adapted to compute a second average of the second plurality of differences. The processing unit may further be adapted to compare the computed second average with the predetermined threshold. The processing unit may further be adapted to trigger a signal, which indicates detection of the EIRP degradation of the transmitter when the computed first average is larger than the predetermined threshold and when the computed second average is larger than the predetermined threshold.

This has the advantage of autonomous and permanent EIRP monitoring based on time differences of C/N0 observations from a ground receiver network (e.g., comprised of standard GNSS receivers), taking benefit of the repeat period of the satellite orbit as seen on ground. While the individual C/N0 measurement of single receivers may be noisy and subject to various effects impacting the local ground station (scintillation, interference, etc.), the combination of simultaneous measurements from multiple receivers does both significantly reduce the measurement noise level and make the monitoring device/system robust to individual ground station anomalies.

Thus, the above-mentioned aspects provide the advantages of enhancing the detection of failures or degradations in signal transmission power of a transmitter of a GNSS satellite.

It is clear to a person skilled in the art that the statements set forth herein under use of hardware circuits, software means or a combination thereof may be implemented. The software means can be related to programmed microprocessors or a general computer, an ASIC (Application Specific Integrated Circuit) and/or DSPs (Digital Signal Processors). For example, the processing unit, the receiver and further memory unit(s) may be implemented partially as a computer, a logical circuit, an FPGA (Field Programmable Gate Array), a processor (for example, a microprocessor, microcontroller (µC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP. It is further clear to the person skilled in the art that even if the herein-described details will be described in terms of a method, these details may also be implemented or realized in a suitable device, a computer processor or a memory connected to a processor, wherein the memory can be provided with one or more programs that perform the method, when executed by the processor. Therefore, methods like swapping and paging can be deployed.

Even if some of the aspects described above have been described in reference to the method, these aspects may also apply to the monitoring device. Likewise, the aspects described above in relation to the monitoring device may be applicable in a corresponding manner to the method.

BRIEF DESCRIPTION OF THE DRAWINGS

Other objects, features, advantages and applications will become apparent from the following description of non-limiting embodiments regarding the accompanying drawings. In the drawings, all described and/or illustrated features, alone or in any combination form the subject matter disclosed therein, irrespective of their grouping in the claims or their relations/references. The dimensions and proportions of components or parts shown in the figures are not necessarily to scale; these dimensions and proportions may differ from illustrations in the figures and implemented embodiments.

DETAILED DESCRIPTION OF THE PREFERRED EMBODIMENTS

Figure 1:
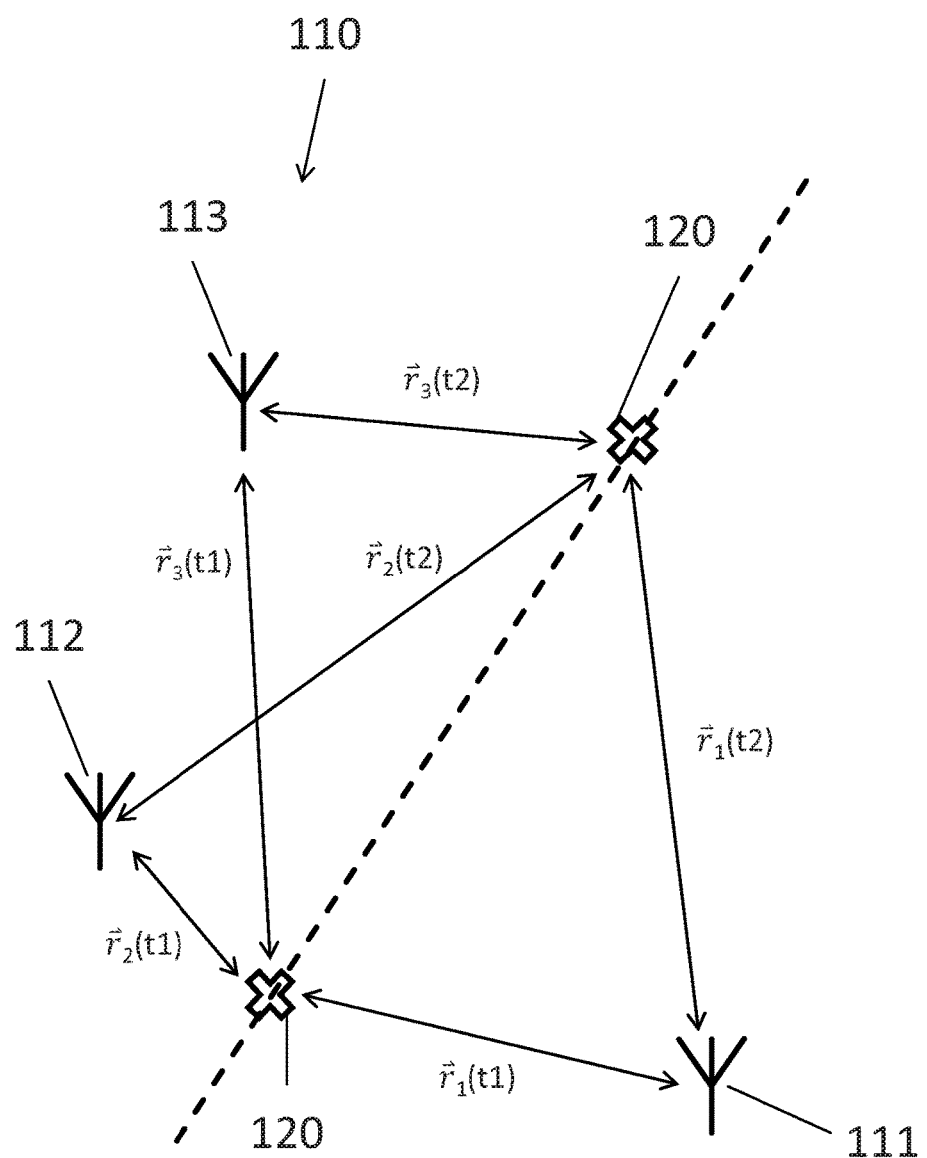
FIG. 1 schematically illustrates a scenario of a GNSS satellite flying over an area comprising three ground receivers.

The variants of the functional and operational aspects as well as their functional and operational aspects described herein are only for a better understanding of its structure, its functions and properties; they do not limit this disclosure to the embodiments. The figures are partially schematic, said essential properties and effects are clearly shown enlarged or scaled down in part to clarify the functions, active principles, embodiments and technical characteristics. Every operation, every principle, every technical aspect and every feature that/which is disclosed in the figures or in the text is/can be combined with all claims, each feature in the text and the other figures, other modes of operation, principles, technical refinements and features that are included in this disclosure, or result from it, so that all possible combinations are assigned to the devices and methods described. They also include combinations of all individual comments in the text, that is, in each section of the description, in the claims and combinations between different variations in the text, in the claims and in the figures, and can be made to subject-matter of further claims. The claims do not limit this disclosure and therefore the possible combinations of all identified characteristics among themselves. All features disclosed are explicitly also individually and in combination with all other features disclosed herein.

In the figures herein, corresponding or functionally similar components are provided with the same or similar reference numerals. The monitoring device and the method will now be described with respect to the embodiments.

In the following, without being restricted thereto, specific details are set forth to provide a thorough understanding of this disclosure. However, it is clear to the skilled person that this disclosure may be used in other embodiments, which may differ from the details set out below.

This disclosure has the advantage or benefit of providing any satellite, satellite system or satellite service provider to implement permanent and autonomous EIRP monitoring of any satellite with repeat orbit constellation. It enables detection and alerting of unexpected variation in satellite transmission power in near-real time and with for example 1s-time resolution.

Regarding GNSS satellites, the underlying concept of this disclosure is based on sets of $C/N_0$ data of standard GNSS receivers of a global ground receiver network. It can either be based on publicly available observation data, for example from the global IGS GNSS receiver network, or based on the existing ground station network of the GNSS system/service provider. For this reason, the monitoring device or also called monitoring system can be implemented at low cost. This disclosure takes advantage of the repeating satellite ground track by taking time differences of $C/N_0$ measurements in order to remove the impact of free space loss, atmospheric loss and receiver antenna gain on the individual $C/N_0$ measurement. By combination of $C/N_0$ measurements from multiple ground station receivers, the monitoring device/system is robust to single receiver anomalies and the measurement noise of the EIRP monitoring device/system is significantly lower than the noise of one single GNSS receiver measurement. Further reduction in measurement noise is obtained by determining the actual repeat period as seen from the topocentric reference frame of the receiver location which may slightly differ from the one derived from the nominal orbital parameters.

Beyond GNSS satellites and signals, the EIRP monitoring device/system can be applied to any satellite transmitting RF signals, provided there is a ground receiver network with high-rate $C/N_0$ measurements available and the satellite is subject to a repeating satellite ground track.

FIG. 1 schematically illustrates a scenario of a GNSS satellite 120 flying over an area comprising three ground receivers 110. A GNSS satellite 120 is positioned at a location at time point $t_1$ and at another location at time point $t_2$. Each of the plurality of receivers 110 is located at a known position. The plurality of receivers 110 is herein also used under the term ground receivers. For example, this can be three ground receivers 111, 112 and 113, which construct the plurality of receivers 110. The position of the satellite with respect to the topocentric reference frame of each of the plurality of receivers 110 is illustrated by their respective vectors $r_1$, $r_2$ and $r_3$. Thus, the satellite is seen from different directions in view of each of the plurality of receivers 110. And for each of the time points $t_1$ and $t_2$, different lengths of the traveling electromagnetic wave transmitted from the satellite to the respective one of the plurality of receivers 110 lead to different signal-to-noise ratios measured at each of the plurality of receivers 110.

Figure 2:
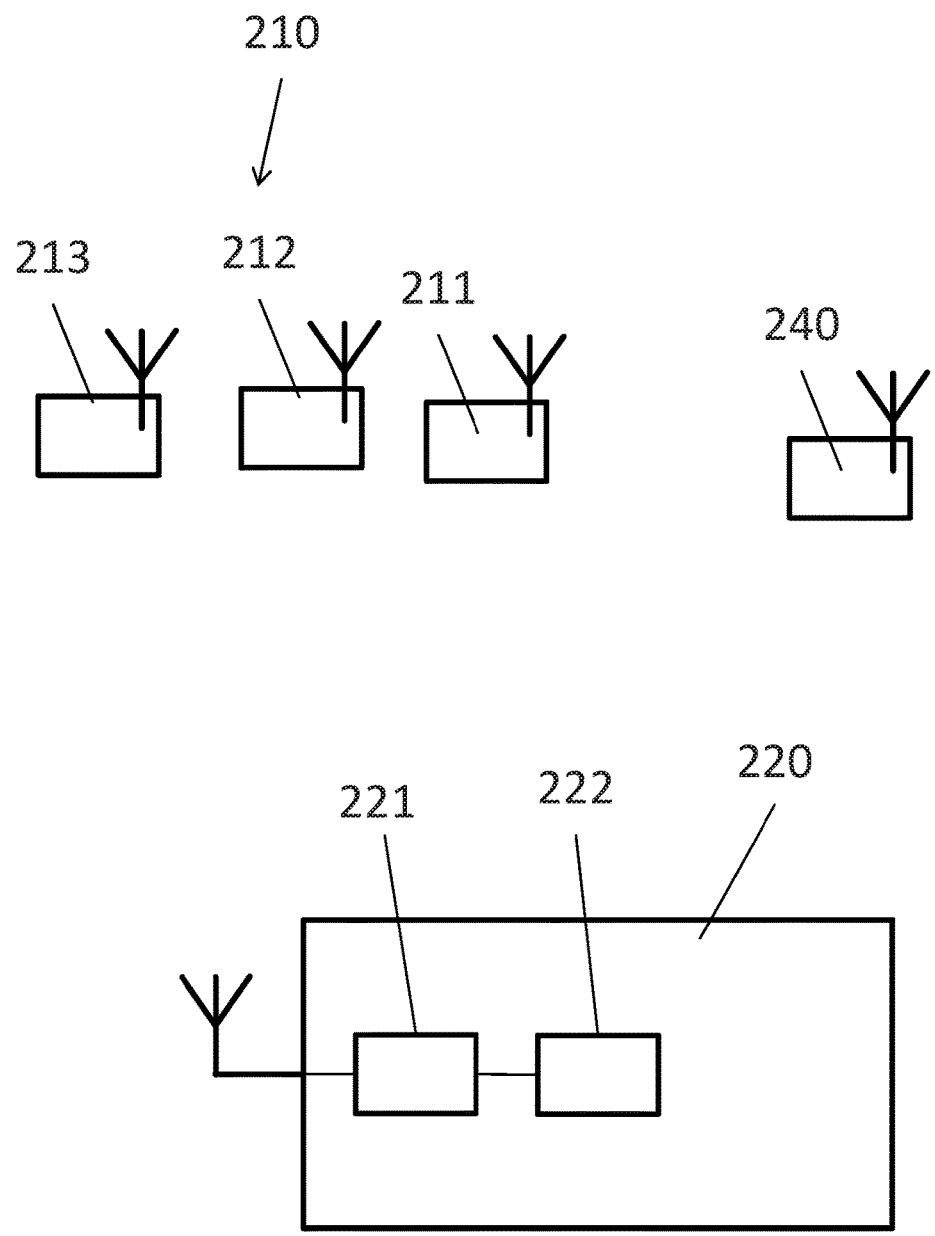
FIG. 2 schematically illustrates a monitoring device for detection of an EIRP degradation of a transmitter of a GNSS satellite together with multiple GNSS receivers and a public network.
Figure 3:
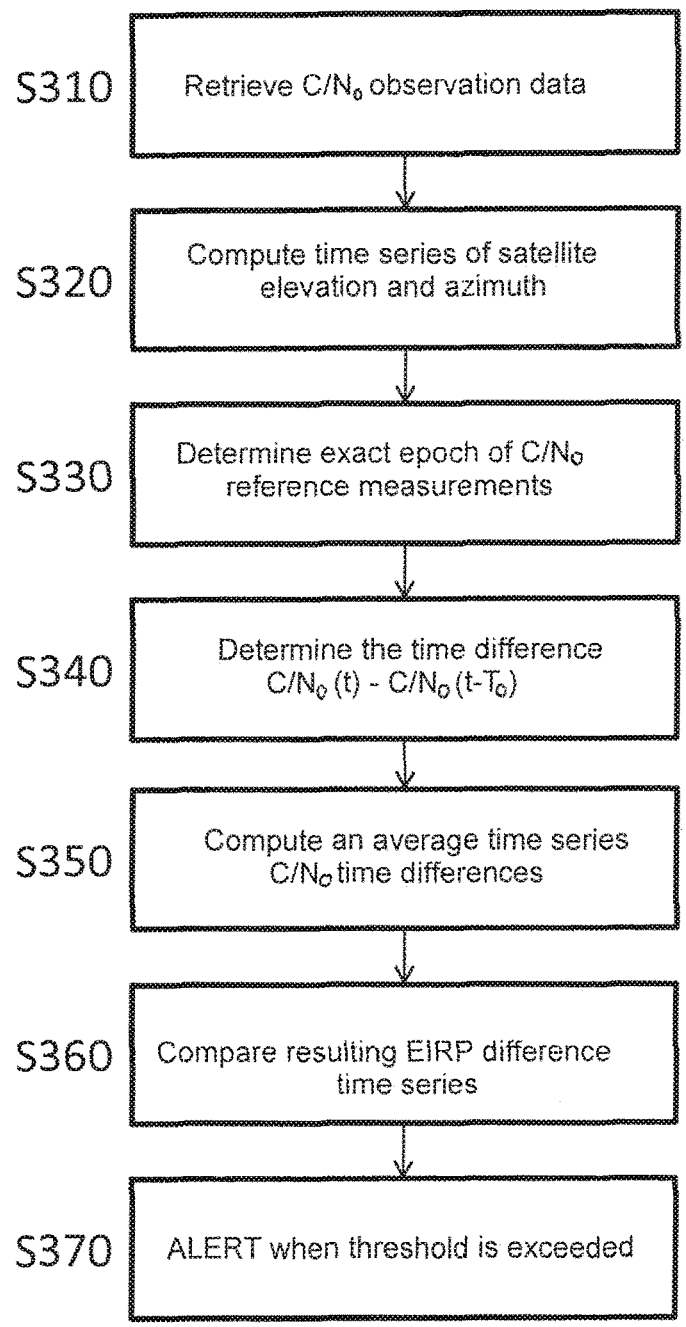
FIG. 3 schematically illustrates an implementation of a method for detection of an EIRP degradation of a transmitter of a GNSS satellite.

The underlying concept of EIRP monitoring as used in the monitoring device/system in FIG. 2 and the method as illustrated in FIG. 3 is based on analysis of $C/N_0$ observations from a ground network of GNSS receivers. At any ground receiver in view of the satellite, the present signal-to-noise ratio, $C/N_0(t)$, results in $$C/N_0 = \frac{P_T G_T G_R \lambda^2}{L_R L_A (4\pi R)^2 k (T_A + T_R)} = \text{EIRP} \frac{G_T G_R \lambda^2}{L_R L_A (4\pi R)^2 k (T_A + T_R) G_{T_{boresight}}} \quad \text{(equation 1)}$$

In equation (1), $P_T$ denotes the RF transmission power at the input of the satellite antenna, $G_T$ denotes the satellite transmission antenna gain in the direction of the ground receiver, $G_R$ denotes the antenna gain of the receiving antenna of the ground receiver in the direction of the satellite, $L_A$ denotes loss due to atmospheric attenuation, $L_R$ denotes receiver loss, R denotes the geometrical distance between the ground receiver and the satellite, $T_A$ denotes the antenna noise temperature, $T_R$ denotes the receiver noise temperature, $\lambda$ denotes the wavelength of the RF signal and k denotes Boltzmann's constant. This is, in principle, applied by the monitoring device/system in FIG. 2.

FIG. 2 schematically illustrates a monitoring device 220 for detection of an EIRP degradation of a transmitter of, for example, a GNSS satellite together with multiple GNSS receivers 210 and a public global network 240 or system internal data source 240. FIG. 2 schematically illustrates the monitoring device 220, with a receiving unit 221 and a processing unit 222. The monitoring device 220 is able to perform a method, as illustrated in FIG. 3, under use of its receiving unit 221 and processing unit 222. This disclosure takes advantage of the constellation/ground track repeat period $T_0$ of GNSS satellites, for example in MEO orbit. At any fixed location on ground, all GNSS satellites are seen from (almost) the same elevation and azimuth every 10 (sidereal) days, in the case of Galileo. For GPS and GLO-NASS satellite constellations, one constellation repeat period $T_0$ does even amount to only one (sidereal) day, i.e., at any ground location any GPS or GLONASS satellite is seen from the same elevation and azimuth direction after one day. The same elevation and azimuth every nth repeat period with respect to FIG. 1 equals either $t_1+n^*T_0$ or $t_2+n^*T_0$.

In nominal conditions (without satellite EIRP degradation/increase and with similar ground receiver environment and similar atmospheric conditions), the $C/N_0$ measurement does not experience a change, when the satellite is seen from the same azimuth and elevation direction.

For this reason, the EIRP monitoring device/system compares the present measurement $C/N_0$ (t) with the measurement $C/N_0$ (t−n*$T_0$) from a reference (time) epoch t−n*$T_0$ (one or several constellation repeat periods ago), when the satellite was seen from the same direction.

The exact orbit repetition period, as seen from a topocentric reference frame, is determined for each ground receiver. As the true repetition period does slightly differ from the theoretical one (which would result from the nominal Keplerian orbit parameters), it is important (in terms of reducing the measurement noise of the EIRP monitoring device/system) to determine the actual repetition period as seen from the ground receivers. For each satellite and each ground receiver, satellite elevation and azimuth is computed from satellite orbit data and known coordinates of the receiver location for the present observation arc and for the reference time periods. Based on the elevation and azimuth timeseries the actual orbit repetition period of each satellite as seen from each ground receiver can be computed.

Both the present $C/N_0$ (t) measurement and the one from the reference (time) epoch $C/N_0$ (t−n*$T_0$) are taken for signals on an identical signal path with very similar path attenuation of the electromagnetic wave propagating through space (same line of sight with identical geometrical distance R resulting in identical free space loss, very similar atmospheric impact on radio propagation $L_A$), same receiving antenna gain $G_R$ and are usually affected by very similar receiver environment (antenna noise temperature $T_A$, multipath).

From the satellite's perspective, each of the ground receivers is seen from the same off-axis angle in both reference (time) epochs. However, the satellite azimuth angle turns over time, as the nominal satellite attitude is turning following the yaw steering law. However, for GNSS satellites, the resulting $C/N_0$ variation is considered small.

Considering the above, the following relation holds true:

$$\frac{EIRP(t)}{EIRP(t-T_0)} \approx \frac{C/N_0(t)}{C/N_0(t-T_0)} \quad \text{(equation 2)}$$

As both $C/N_0$ and EIRP are conventionally determined in dBHz and dBW, equation (2) is re-written as:

$$EIRP(t)_{,dBW} - EIRP(t-T_0)_{,dBW} \approx C/N_0(t)_{,dBHz} - C/N_0(t-T_0)_{,dBHz} \quad \text{(equation 3)}$$

Thus, due to the repeating constellation geometry, the difference between the present $C/N_0$ (t) observation and the $C/N_0$ (t−$T_0$) measurement from a reference (time) epoch t−$T_0$ one ground track repeat period ago (i.e., about 10 days ago for Galileo satellites) can be applied to monitor and measure the variation in satellite EIRP during this time period.

Obviously, individual $C/N_0$ measurements from individual ground receivers can be quite noisy and can still be affected by various other effects that are not related to the satellite's transmitter EIRP.

Local ground receivers could, for example, be affected by an occurrence of amplitude fading due to ionospheric scintillation, which may result in strong degradation of $C/N_0$ measurements. Other ground receivers could be temporarily impacted by local interference or could be subject to any receiver malfunction impacting the $C/N_0$ measurements.

However, the combination of simultaneous measurements from multiple ground receivers (e.g., in terms of an average, like a median in $C/N_0$ difference) is independent of those local ground receiver effects. Any EIRP degradation occurring aboard the satellite, on the other hand, would be observed and detected by the monitoring device as illustrated in FIG. 2.

$$EIRP(t)_{,dBW} - EIRP(t-T_0)_{,dBW} \approx \text{median}_{i=1,n}(C/N_{0,RCXi}(t)_{,dBHz} - C/N_{0,RCXi}(t-T_0)_{,dBHz}) \quad \text{(equation 4)}$$

It is beneficial to monitor EIRP variation with respect to two different reference epochs (e.g., t−$T_0$ and t−2*$T_0$) in order to distinguish EIRP variation occurring at the present epoch t from EIRP variation that has already occurred at the reference epoch t−2*$T_0$ or t−$T_0$:

$$EIRP(t)_{,dBW} - EIRP(t-T_0)_{,dBW} \approx \text{median}_{i=1,n}(C/N_{0,RCXi}(t)_{,dBHz} - C/N_{0,RCXi}(t-T_0)_{,dBHz})$$

$$EIRP(t)_{,dBW} - EIRP(t-2^*T_0)_{,dBW} \approx \text{median}_{i=1,n}(C/N_{0,RCXi}(t)_{,dBHz} - C/N_{0,RCXi}(t-2^*T_0)_{,dBHz}) \quad \text{(equation 5)}$$

EIRP variation occurring at the present (monitoring) time t will affect both time differences, while past EIRP variations occurring at the reference (time) epoch t−2*$T_0$ or t−$T_0$ will only affect one of them.

For this reason, only EIRP variations which are simultaneously exceeding a pre-defined threshold for both time differences will trigger an EIRP alert. This is explicitly shown in FIG. 4.

In case, an absolute EIRP measurement is available (from an EIRP measurement campaign) for a starting epoch $t_0$, monitored $C/N_0$ differences can be added up to result in a time series of absolute satellite EIRP (in dBW):

$$EIRP(t_0+n^*T_0)_{,dBW} \approx EIRP(t_0)_{,dBW} + \Sigma_{j=1}^{n} \text{median}_{i=1..n}(C/N_{0,RCXi}(t_0+j^*T_0)_{,dBHz} - C/N_{0,RCXi}(t_0+(j-1)^*T_0)_{,dBHz})$$

$$\approx EIRP(t_0)_{,dBW} + \text{median}_{i=1..n}(C/N_{0,RCXi}(t_0+n^*T_0)_{,dBHz} - C/N_{0,RCXi}(t_0)_{,dBHz}) \quad \text{(equation 6)}$$

In case, absolute EIRP measurements are provided from periodic (e.g., monthly) EIRP measurement campaigns, the EIRP monitoring could be reset from time to time.

EIRP monitoring delay and time-to-alert will mainly depend upon the availability of input data.

For example, a complete set of RINEX observation data for a selected set of MGEX ground receivers is typically made available on public ftp servers within a time period of 15 minutes to 1 hour.

A satellite system/service provider has typically access to present observation data of its own ground receiver network within near-real time (seconds). So, a near-real time implementation can be achieved.

FIG. 3 schematically illustrates an implementation of a method for detection of an EIRP degradation of a transmitter of a GNSS satellite. As said before, the method is not limited to GNSS satellites, but could also be applied to any other satellite in repeat orbit and transmitting any RF signals which are monitored by a ground receiver network.

In more detail, the EIRP monitoring method can be implemented to automatically run the following steps (e.g., once an hour):

Retrieve S310 $C/N_0$ observation data either from GNSS system/service provider ground network or from public global network of Ground receivers and preprocess data;

Retrieve S310 satellite orbit data from public sources or from broadcast navigation message data. Satellite orbit data is retrieved for the present day and for two reference epochs (for GNSS: 10 and 20 days ago) and satellite orbit positions are computed with respect to an Earth-centered Earth-fixed reference frame, for example in sp3-format;

Compute S320 time series of satellite elevation and azimuth for any ground receiver position and any satellite to be monitored based on the satellite orbit data for the present day and the two reference time periods;

Determine S330 the exact epoch of $C/N_0$ reference measurements from the elevation time series in order to identify for each satellite and each ground receiver the time period $T_0$ after which the satellite is seen from the same elevation and azimuth;

Determine S340 the time difference $C/N_0(t) - C/N_0(t-T_0)$ for any monitoring receiver, any satellite and any navigation signal;

Determine S340 the time difference $C/N_0(t) - C/N_0(t-2*T_0)$ for any monitoring receiver, any satellite and any navigation signal;

Compute S350 an average time series of $C/N_0$ time differences, for example a mean or median, over all Ground receiver (for both types of time differences);

Optionally, Filter S355 (not shown) the resulting time series (e.g., moving average/moving median) to reduce measurement noise;

Compare S360 resulting EIRP difference time series with a defined threshold of minimum EIRP variation to be detected;

Alert S370, once the threshold is exceeded in both time series; and

Optionally, Sum S380 (not shown) $C/N_0$ time difference $C/N_0(t) - C/N_0(t-T_0)$ to absolute EIRP time series from $EIRP(t-T_0)$.

Figure 4:
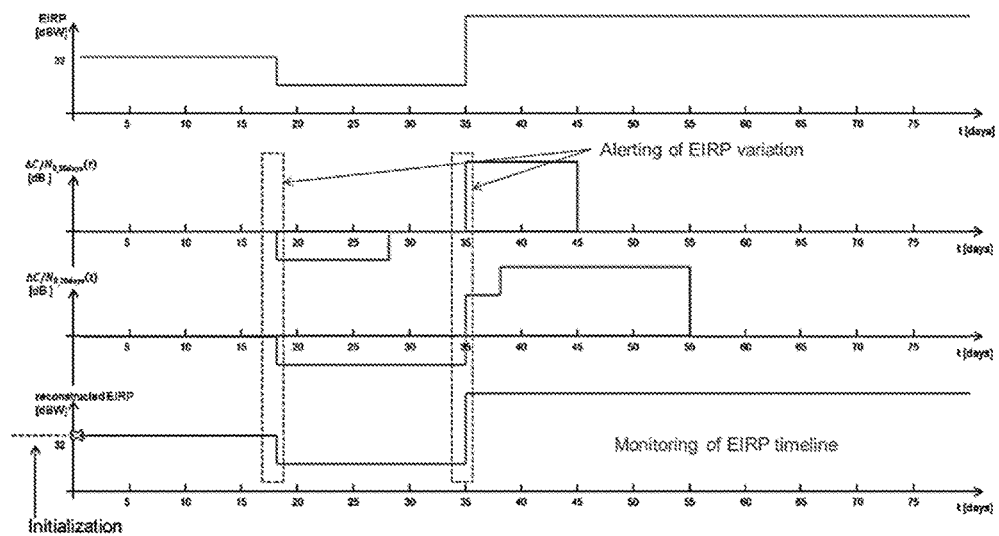
FIG. 4 schematically illustrates EIRP monitoring with two different (time) epochs for Galileo satellites with a ground track repeat period of 10 sidereal days.

Results of an implemented method as shown in FIG. 3 are illustrated in FIG. 4.

FIG. 4 schematically illustrates EIRP monitoring for Galileo satellites (as an example) with two different reference (time) epochs. Four charts are shown, EIRP/dBW, $\Delta C/N_{0,10days}(t)/dB$, $\Delta C/N_{0,20days}(t)/dB$ and reconstructed EIRP/dBW. The monitoring of EIRP timeline illustrates a change in the signal transmission power, detected in the $C/N_0$ difference with respect to both reference (time) epochs. Both charts $\Delta C/N_{0,10days}(t)/dB$ and $\Delta C/N_{0,20days}(t)/dB$ show a variation in signal-to-noise and therefore an EIRP variation. This variation is then followed by triggering an alert, such that the monitoring device/system is able to inform the GNSS system or service provider.

This disclosure is not limited in any way to the embodiments described above. On the contrary, there are many possibilities for modifications thereof, which are apparent to an average skilled person without departing from the underlying idea of this disclosure as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for detection of an Equivalent Isotropically Radiated Power (EIRP) degradation of a radio frequency (RF) transmitter of a satellite being in an orbit with a repeating ground track, the method comprising:

obtaining sets of signal-to-noise ($C/N_0$) data from a first source and obtaining satellite orbit data of the satellite from a second source, wherein each set of $C/N_0$ data is associated with the satellite and a respective one of a plurality of receivers;

computing temporal information on an elevational and azimuthal direction of the satellite with respect to respective locations of each of the plurality of receivers based on the satellite orbit data and the respective locations of each of the plurality of receivers;

determining a time interval based on the temporal information, in which time interval the repeating ground track repeats a single time;

determining, for each of the plurality of receivers, a respective one of a first plurality of differences between a first value of the respective set of $C/N_0$ data corresponding to a first time point and a second value of the respective set of $C/N_0$ data corresponding to a second time point, wherein the first and second time points are apart by the time interval;

computing a first average of the first plurality of differences;

comparing the computed first average with a predetermined threshold; and triggering a signal, which indicates detection of the EIRP degradation of the transmitter when the computed first average is larger than the predetermined threshold.

2. The method according to claim 1, wherein the first source is associated with a plurality of receivers on ground and the second source is associated with the satellite or a satellite orbit data base.

3. The method according to claim 1, wherein a number of the sets of $C/N_0$ data corresponds to a number of receivers on ground times a number of satellites to be monitored.

4. The method according to claim 1, wherein the first source is a service provider ground network or a public network of the plurality of receivers, wherein the second source is a plurality of public sources for satellite orbit data or one of the satellites broadcasting orbit data.

5. The method according to claim 1, wherein the satellite orbit data is obtained for a present day and two reference epochs, wherein the step of computing the temporal information is performed for the present day and the two reference epochs, wherein the reference epoch is apart from the present day by once or twice the time interval.

6. The method according to claim 1, wherein, after, before or simultaneously determining the first plurality of differences, the step of determining, for each of the plurality of receivers, a respective one of a second plurality of differences between the first value of the respective set of $C/N_0$ data corresponding to a first time point and a third value of the respective set of $C/N_0$ data corresponding to a third time point is performed, wherein the first and third time points are apart by twice the time interval.

7. The method according to claim 6, further comprising:
computing a second average of the second plurality of differences;
comparing the computed second average with the predetermined threshold; and
triggering a signal, which indicates detection of the EIRP degradation of the transmitter, when the computed first average is larger than the predetermined threshold and when the computed second average is larger than the predetermined threshold.

8. A monitoring device for detection of an Equivalent Isotropically Radiated Power (EIRP) degradation of a radio frequency (RF) transmitter of a satellite being in an orbit with a repeating ground track, the monitoring device comprising:
a receiving unit configured to receive sets of signal-to-noise ($C/N_0$) data from a first source and to receive satellite orbit data of the satellite from a second source, wherein each set of $C/N_0$ data is associated with the satellite and a respective one of a plurality of receivers; and
a processing unit configured to:
compute temporal information on an elevational and azimuthal direction of the satellite with respect to respective locations of each of the plurality of receivers based on the satellite orbit data and the respective locations of each of the plurality of receivers,
determine a time interval based on the temporal information, in which time interval the repeating ground track repeats a single time,
determine, for each of the plurality of receivers, a respective one of a first plurality of differences between a first value of the respective set of $C/N_0$ data corresponding to a first time point and a second value of the respective set of $C/N_0$ data corresponding to a second time point, wherein the first and second time points are apart by the time interval,
compute a first average of the first plurality of differences,
compare the computed first average with a predetermined threshold, and
trigger a signal, which indicates detection of the EIRP degradation of the transmitter when the computed first average is larger than the predetermined threshold.

9. The monitoring device according to claim 8, wherein the first source is associated with a plurality of receivers on ground and the second source is associated with the satellite or a satellite orbit data base.

10. The monitoring device according to claim 8, wherein a number of the sets of $C/N_0$ data corresponds to a number of receivers on ground times a number of satellites to be monitored.

11. The monitoring device according to claim 8, wherein the first source is a service provider ground network or a public network of the plurality of receivers, wherein the second source is a plurality of public sources for satellite orbit data or one of the satellites broadcasting orbit data.

12. The monitoring device according to claim 8, wherein the receiving unit is adapted to receive the satellite orbit data for a present day and two reference epochs, and wherein the processing unit is adapted to compute the temporal information for the present day and the two reference epochs, wherein the reference epoch is apart from the present day by once or twice the time interval.

13. The monitoring device according to claim 8, wherein the processing unit is adapted to determine, after, before or simultaneously determining the first plurality of differences, for each of the plurality of receivers, a respective one of a second plurality of differences between the first value of the respective set of $C/N_0$ data corresponding to the first time point and a third value of the respective set of $C/N_0$ data corresponding to a third time point, wherein the first and third time points are apart by twice the time interval.

14. The monitoring device according to claim 13, wherein the processing unit is further configured to:
compute a second average of the second plurality of differences;
compare the computed second average with the predetermined threshold; and
trigger a signal, which indicates detection of the EIRP degradation of the transmitter when the computed first average is larger than the predetermined threshold and when the computed second average is larger than the predetermined threshold.

* * * * *